US012478878B2

(12) United States Patent
Zhang

(10) Patent No.: US 12,478,878 B2
(45) Date of Patent: Nov. 25, 2025

(54) METHOD FOR DISPLAYING MULTI-FLOOR MAP, NON-VOLATILE STORAGE MEDIUM AND PROCESSOR

(71) Applicant: NETEASE (HANGZHOU) NETWORK CO., LTD., Zhejiang (CN)

(72) Inventor: Zhiyi Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 160 days.

(21) Appl. No.: 18/548,526

(22) PCT Filed: Mar. 3, 2022

(86) PCT No.: PCT/CN2022/079150

§ 371 (c)(1),
(2) Date: Aug. 31, 2023

(87) PCT Pub. No.: WO2022/267528

PCT Pub. Date: Dec. 29, 2022

(65) Prior Publication Data

US 2024/0050852 A1 Feb. 15, 2024

(30) Foreign Application Priority Data

Jun. 23, 2021 (CN) ........................ 202110700736.X

(51) Int. Cl.
*A63F 13/5378* (2014.01)

(52) U.S. Cl.
CPC ................................ *A63F 13/5378* (2014.09)

(58) Field of Classification Search
CPC .... A63F 13/53; A63F 13/426; A63F 13/5375; A63F 13/5372
See application file for complete search history.

(56) References Cited

U.S. PATENT DOCUMENTS 9,652,115 B2 * 5/2017 Zhou .................. G06F 3/04815
2005/0130738 A1 * 6/2005 Miyamoto .............. A63F 13/10
463/30

(Continued)

FOREIGN PATENT DOCUMENTS

CN 104103211 A 10/2014
CN 104166657 A 11/2014

(Continued)

OTHER PUBLICATIONS

International Search Report dated Jun. 1, 2022 of International Application No. PCT/CN2022/079150.

(Continued)

*Primary Examiner* — James S. McClellan
(74) *Attorney, Agent, or Firm* — Qinghong Xu

(57) ABSTRACT

A method for displaying a multi-floor map, including: obtaining, by a game terminal, position information of a target virtual object in a game scene, the game terminal at least including a graphical user interface; determining a current floor where the target virtual object is located according to the position information; and displaying a target map in the graphical user interface, where the target map comprises a first map corresponding to the current floor displayed in a first display state and a second map corresponding to another floor displayed in a second display state, where the first display state and the second display state are respectively used for determining a display content of the target map on the graphical user interface.

20 Claims, 8 Drawing Sheets

(56) References Cited

U.S. PATENT DOCUMENTS

| | | | | |
|---|---|---|---|---|
| 2016/0102983 | A1* | 4/2016 | Javed | G01C 21/206 701/532 |
| 2019/0051094 | A1 | 2/2019 | Russ et al. | |
| 2019/0076739 | A1 | 3/2019 | Ge | |
| 2022/0080308 | A1* | 3/2022 | Fung | G06F 3/0488 |

FOREIGN PATENT DOCUMENTS

| | | | |
|---|---|---|---|
| CN | 105183862 | A | 12/2015 |
| CN | 111035918 | A | 4/2020 |
| CN | 111530073 | A | 8/2020 |
| CN | 111629225 | A | 9/2020 |
| CN | 112015836 | A | 12/2020 |
| CN | 112402962 | A | 2/2021 |
| CN | 112717404 | A | 4/2021 |
| CN | 112843705 | A | 5/2021 |
| CN | 113476843 | A | 10/2021 |

OTHER PUBLICATIONS

Notice of Allowance dated Dec. 15, 2023 for Chinese Application No. 202110700736.X.

1st Office Action dated Nov. 23, 2023 for Chinese Application No. 202110700736.X.

* cited by examiner

Obtaining position information of a target virtual object in a game scene — S402

↓

Determining a current floor where the target virtual object is located according to the position information — S404

↓

Displaying a target map in the graphical user interface — S406

METHOD FOR DISPLAYING MULTI-FLOOR MAP, NON-VOLATILE STORAGE MEDIUM AND PROCESSOR

CROSS REFERENCE

The present disclosure is a National Stage Application of International Application No. PCT/CN2022/079150, filed on Mar. 3, 2022, which is based upon and claims the priority of Chinese Patent Application No. 202110700736.X entitled "Method and device for displaying multi-floor map", filed on Jun. 23, 2021, and the entire contents of both of which are incorporated herein by reference for all purposes.

TECHNICAL FIELD

The present disclosure relates to the field of computers, and in particular, to a method and device for displaying a multi-floor map, a non-volatile storage medium and a processor.

BACKGROUND

In a game, the player may not only observe the position and direction of the teammates and the terrain features in the game scene through a mini-map displayed on the game interface, but also may locate his own position.

SUMMARY

According to one aspect of the embodiments of the present disclosure, there is provided a method for displaying a multi-floor map, which is applied to a game terminal; the game terminal at least includes a graphical user interface, and the method includes: obtaining position information of a target virtual object in a game scene; determining a current floor where the target virtual object is located according to the position information; and displaying a target map in the graphical user interface, where the target map includes a first map corresponding to that the current floor is displayed in a first display state and a second map corresponding to that another floor is displayed in a second display state, where the first display state and the second display state are respectively used for determining a display content of the target map on the graphical user interface According to another aspect of the embodiments of the present disclosure, there is further provided a non-volatile storage medium, a computer program is stored in the non-volatile storage medium, and the computer program is configured to execute the method for displaying a multi-floor map when running.

According to another aspect of the embodiments of the present disclosure, there is further provided a processor, where the processor is configured to run a program, and the program is configured to execute the display method of a multi-floor map when running.

BRIEF DESCRIPTION OF THE DRAWINGS

The accompanying drawings described here are used to provide further understanding of the present disclosure, which constitute a part of the present disclosure. The illustrative embodiments of the present disclosure and the description of them are used to explain the present disclosure, and do not constitute an improper limitation on the present disclosure. In the accompanying drawings.

DETAILED DESCRIPTION

In order to make those skilled in the art better understand the solutions of the present disclosure, the technical solutions in the embodiments of the present disclosure will be clearly and completely described below with reference to the accompanying drawings in the embodiments of the present disclosure. All other embodiments obtained by those of ordinary skills in the art based on the embodiments of the present disclosure without creative efforts shall fall within the protection scope of the present disclosure.

It should be noted that the terms "first", "second" and the like in the description and claims of the present disclosure and the accompanying drawings are used to distinguish similar objects, and do not need to be used to describe a specific sequence or order. It should be understood that the data used in this way may be interchanged under appropriate circumstances so that the embodiments of the present disclosure described here can be implemented in an order other than those illustrated or described here. Furthermore, the terms "including" and "comprising" and any variations of them are intended to cover non-exclusive inclusion. For example, including processes, methods, systems, products, or devices of a series of steps or units, which is not necessarily limited to those steps or units clearly listed, but may include other steps or units not expressly listed or inherent to these processes, methods, products, or devices.

Figure 1:
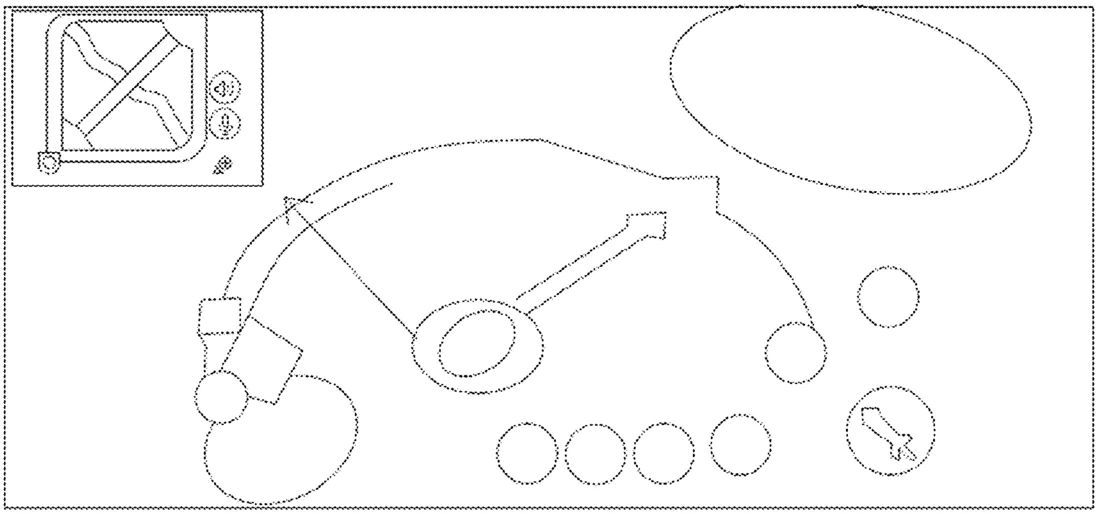
FIG. 1 is a schematic diagram of a mini-map in a display interface according to the related art.
Figure 2:
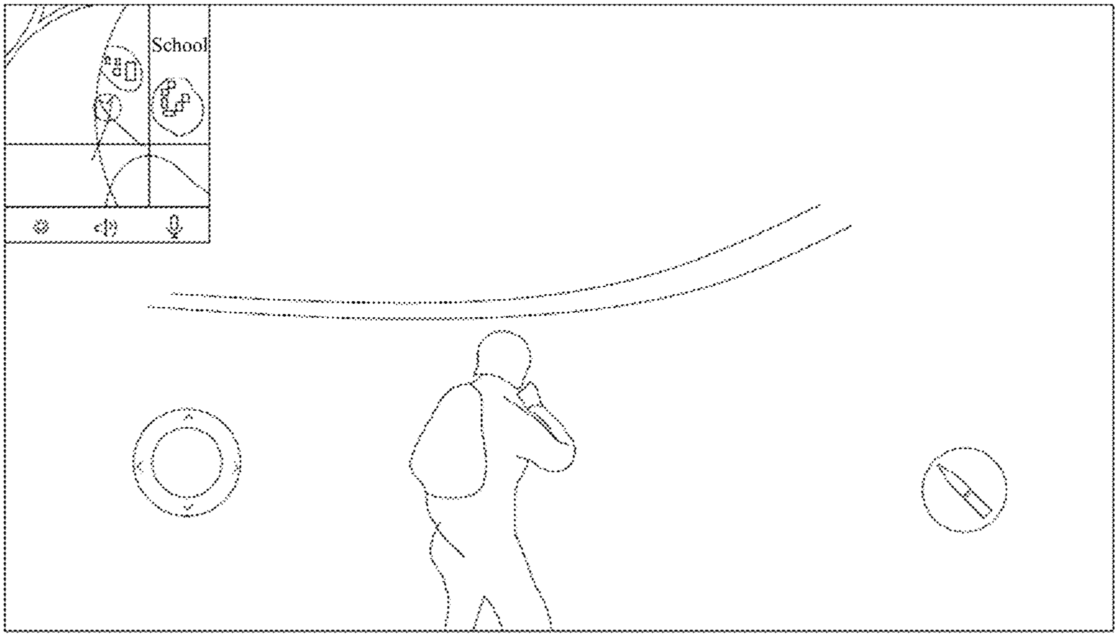
FIG. 2 is a schematic diagram of a mini-map in a display interface according to the related art.
Figures 3, 4:
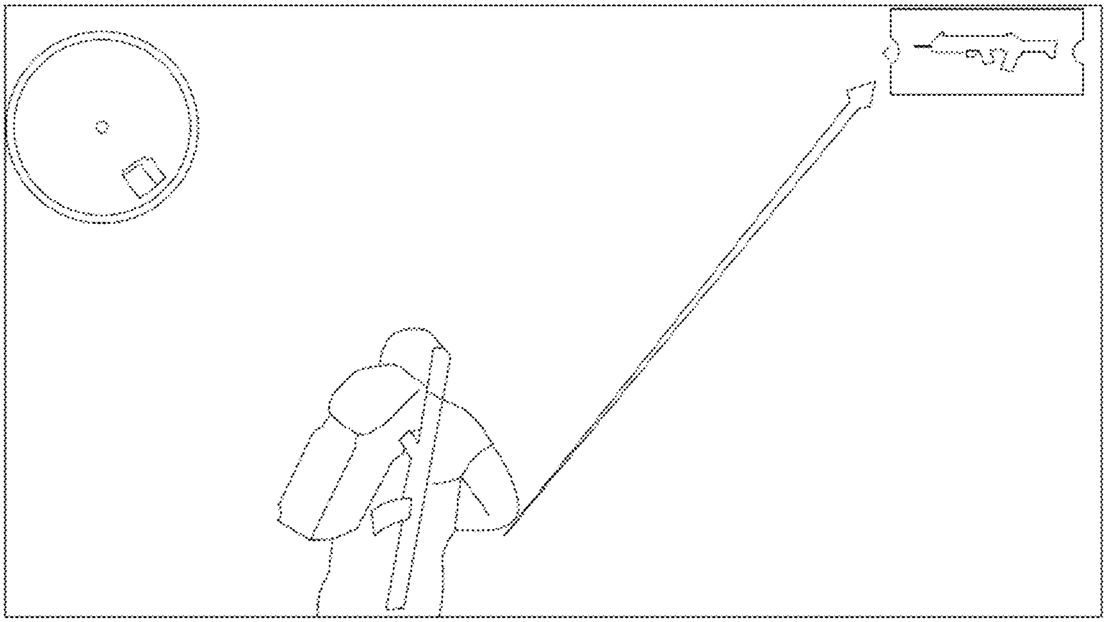
FIG. 3 is a schematic diagram of a mini-map in a display interface according to the related art.
FIG. 4 is a flowchart of a method for displaying a multi-floor map according to an embodiment of the present disclosure.

In related art, there are mainly three display modes for the mini-map in a mobile game, that is: a full-screen map display mode (the mini-map in the display interface as shown in FIG. 1), and a partial region map display mode, where the partial region map display mode is further classified into a circular display mode (the mini-map in the display interface as shown in FIG. 2) and a square display mode (the mini-map in the display interface as shown in FIG. 3).

Although the mini-map in related art can enable a player to know terrain features in a game scene and distribution features of game objects, the mini-map can express information in the same floor in a building, but cannot accurately express differences between different floors.

For the above problems, an effective solution has not been proposed currently.

According to embodiments of the present disclosure, there is provided a method for displaying a multi-floor map. It should be noted that the steps shown in the flowchart of the accompanying drawings may be executed in a computer system such as a set of computer-executable instructions, and although a logical order is shown in the flowchart, in some cases, the illustrated or described steps may be performed in a different order from the order here.

In addition, it should be further noted that the method provided in the embodiments may be applied to a game terminal, for example, a mobile phone, a tablet, a computer and other equipment. In some embodiments, the game terminal at least includes a graphical user interface, and a mini-map in the game may be displayed on the graphical user interface.

FIG. 4 is a flowchart of a method for displaying a multi-floor map according to an embodiment of the present disclosure. As shown in FIG. 4, the method includes the following steps.

In step S402, position information of a target virtual object in a game scene is obtained.

In the step S402, the target virtual object is a virtual character controlled by the game player, or may also be a virtual character watched by the player. When the game is running, the game terminal obtains position information of the target virtual object in the game scene in real time. Among them, the position information of the target virtual object includes but is not limited to a horizontal position and a height position, and the height position represents height information of the target virtual object relative to the ground in the game scene. For example, in a game scene of a multi-floor building, if the target virtual object is on the first floor of the virtual building, it is determined that the height of the target virtual object is 0; and if the target virtual object is on the second floor of the virtual building, it is determined that the height of the target virtual object is H (where H represents the height of the second floor).

In step S404, a current floor where the target virtual object is located is determined according to the position information.

In some embodiments, the game terminal may determine the current floor where the target virtual object is located according to the height information of the target virtual object. For example, if the height h of the target virtual object is greater than a preset height H, it is determined that the current floor where the target virtual object is located is the second floor; and if the height h of the target virtual object is not greater than the preset height H, it is determined that the current floor where the target virtual object is located is the first floor.

In step S406, a target map is displayed in the graphical user interface. The target map includes a first map corresponding to the current floor, and a second map corresponding to another floor. In some embodiments, the first map is displayed in a first display state and a second map is displayed in a second display state. In some embodiments, the first display state and the second display state are respectively used for determining a display content of the target map on the graphical user interface.

Figure 6:
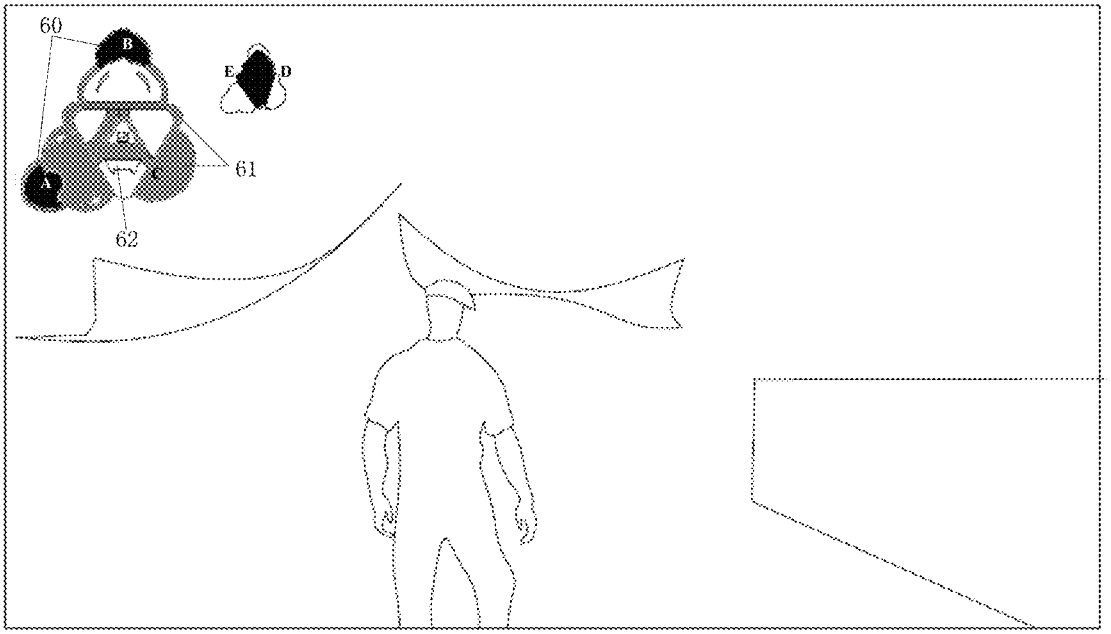
FIG. 6 is a schematic diagram of a graphical user interface according to an embodiment of the present disclosure.
Figure 7:
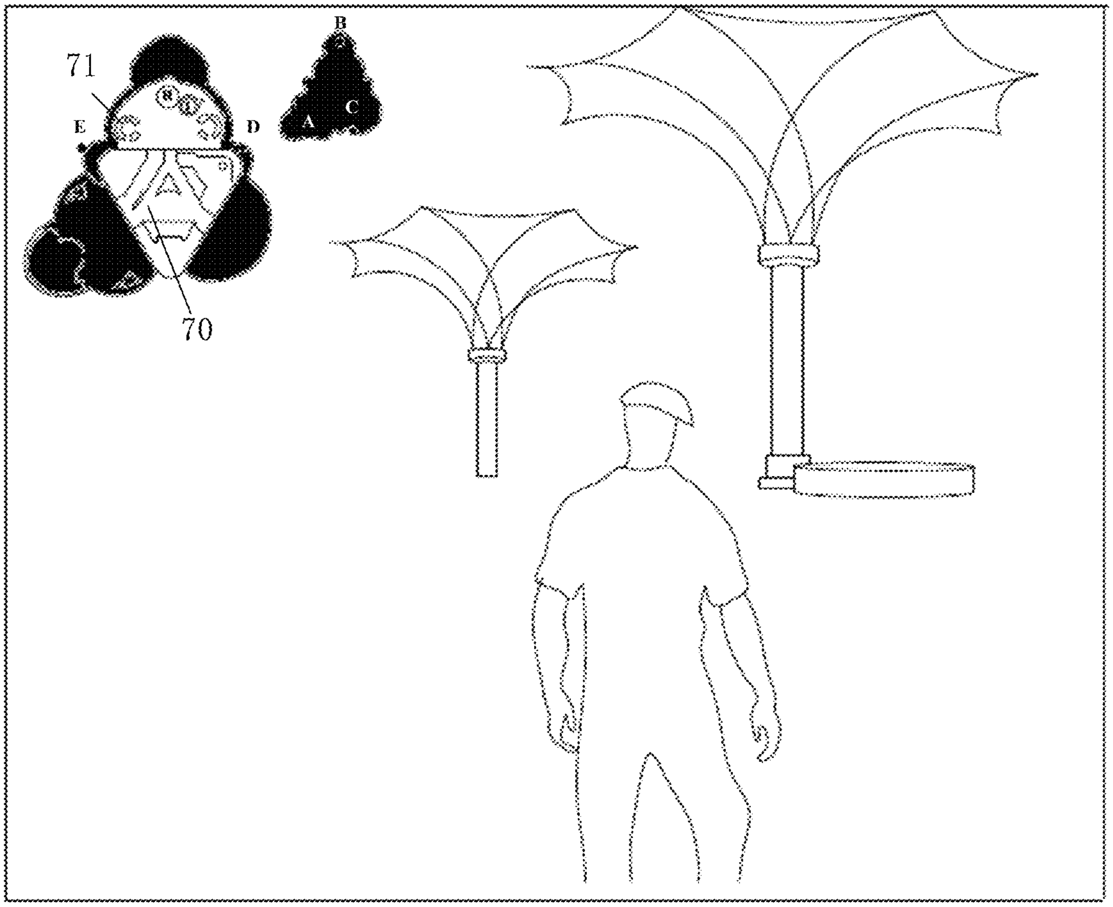
FIG. 7 is a schematic diagram of a graphical user interface according to an embodiment of the present disclosure.

In step S406, the display content in the first display state includes a map detail of the first map and a real-time position mark of the target virtual object in the first map, where the map detail of the first map includes, but is not limited to, a red highlighted region position, a channel position, a door position, a wall position, a task point position, and the like on the floor corresponding to the first map; the display content in the second display state includes a map overview of the second map, where the map overview of the second map includes, but is not limited to, contour information of the floor corresponding to the second map. For example, in the graphical user interface shown in FIG. 6, the current floor where the target virtual object is located is the first floor, and the map corresponding to the first floor (i.e., the first map) displays the detailed map content; for example, the mini-map on the left of the map in FIG. 6 displays the position information of the virtual character (such as A, B, and C in the mini-map on the left in FIG. 6), the red highlighted region information (such as 60 in FIG. 6), the channel position (such as 61 in FIG. 6), and the door position (such as 62 in FIG. 6); the map corresponding to the second floor (i.e., the second map) displays the thumbnail map content; for example, the mini-map on the right of the map in FIG. 6 may display the position information of the virtual character (such as D and E in FIG. 6), as well as the contour information of the map corresponding to the second floor (such as the black contour in the mini-map on the right in FIG. 6). For another example, in the graphical user interface shown in FIG. 7, the current floor where the target virtual object is located is the second floor, then the map corresponding to the second floor (i.e., the first map) displays the detailed map content; for example, the white region in the mini-map on the left in FIG. 7 displays the channel 70 and desk and chair position 71 on the second floor; the map corresponding to the first floor (i.e., the second map) displays the thumbnail map content, for example, the min-map on the right in FIG. 7 may display the contour of the first floor region.

In some embodiments, the map detail of the first map and the map overview are static information, and the real-time position mark is dynamic information. The static information is information that does not change with changes in time and/or space, such as the position of the wall, the position of the door, etc. The dynamic information is information that changes with changes in time and/or space; for example, the position information of the target virtual object in the game scene changes in real time.

In addition, the map detail of the first map at least includes a virtual environment model, and the virtual environment model at least includes a building model and a virtual object model; for example, the building model may include a wall, a door, a channel, a marked region (e.g., a red highlighted region) in the game scene, etc.; and, the virtual object model may include a stair, an elevator, etc.

Figure 5:
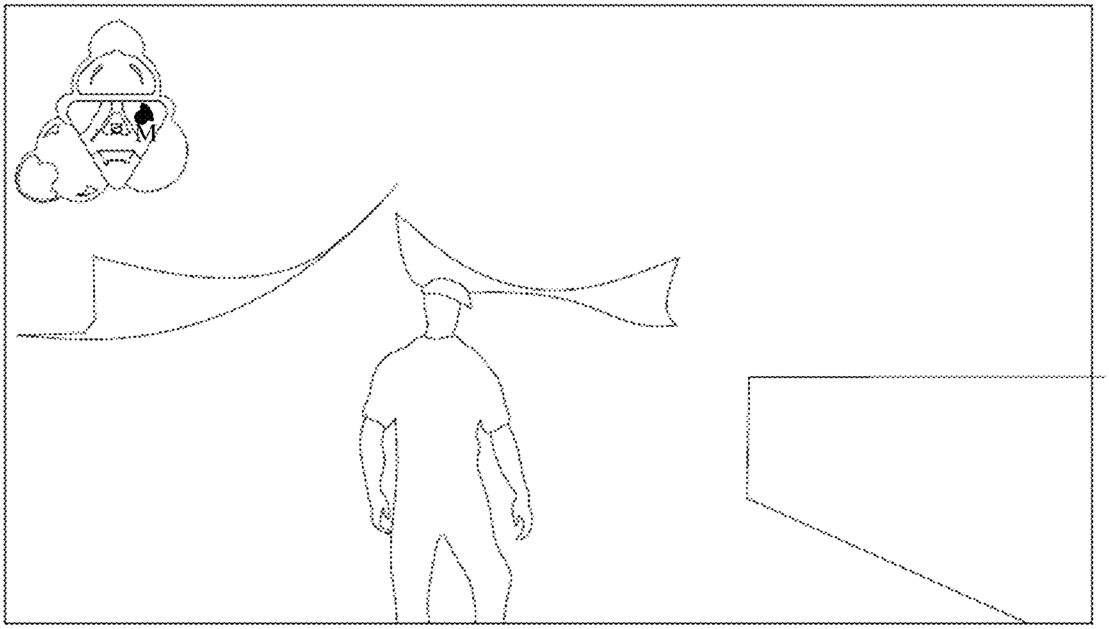
FIG. 5 is a schematic diagram of a graphical user interface according to an embodiment of the present disclosure.

In addition, the real-time position mark of the target virtual object in the first map can represent the position information and the movement orientation of the target virtual object. For example, in the graphical user interface shown in FIG. 5, the fan-shaped region M represents the target virtual object on the first map, where the orientation of the fan-shaped region represents the movement orientation of the target virtual object. In addition, the position and movement orientation of the target virtual object on the first map may be represented by using an arrow, and in this scenario, the direction of the arrow indicates the movement orientation of the target virtual object.

It should be noted that, in practical application, whether the map is the first map or the second map may be distinguished according to whether the map includes the virtual environment model. In addition, the first map and the second map may also be distinguished through a bright region and a shaded region. For example, the first map is represented in a bright region, and the second map is represented in a shaded region. In addition, the second map displays a map overview including, but not limited to, the contour information of the floor, the position mark of the target virtual object, the position mark of another virtual object, the target point position mark and the like. For example, in the second map, the origin may be used to represent the position mark of another virtual object, and the position mark do not indicate the movement orientation of another virtual object.

In addition, it should be noted that the bright region and the shaded region may be used for distinguishing the display content of the first map corresponding to the current floor and the display content of the second map corresponding to another floor, and may also be used for distinguishing the region where the target virtual object is located and another region. For example, the region where the target virtual object is located is a bright region, and another region (for example, the region where the stair is located) is a shaded region. The bright region and the shaded region may also be used for distinguishing the region where the target virtual object is located and the region where another virtual object is located; for example, the region where the target virtual object is located is a bright region, and the region where another virtual object is located is a shaded region. The bright region and the shaded region may also be used for distinguishing the region where a first virtual object belonging to a same character camp as the target virtual object is located and the region where a second virtual object belonging to a different character camp from the target virtual object is located. For example, the region where the first virtual object (such as the virtual object corresponding to a teammate) is located is a bright region, and the region where the second virtual object (such as the virtual object corresponding to an enemy) is located is a shaded region.

In some embodiments, the display content in the first display state may further include: a position mark of another virtual object located in the first map and/or a target point position mark. That is, the position mark of the virtual object corresponding to a teammate located on the current floor or the position mark of the virtual object corresponding to an enemy located on the current floor, and/or the target point position mark may also be displayed on the first map.

In addition, the display content in the second display state may further include a position mark of another virtual object located in the second map and/or a target point position mark. That is, the position mark of the virtual object corresponding to a teammate located on the floor corresponding to the second map or the position mark of the virtual object corresponding to an enemy located on the floor corresponding to the second map, and/or the target point position mark may also be displayed on the second map.

It should be noted that the position marks and the target point position marks included in the display content in the first display state and the display content in the second display state may be dynamically refreshed position marks, such as, the position mark of the virtual object corresponding to the teammate, the position mark of the virtual object corresponding to the enemy, and the target point position mark corresponding to the task point, the transmission point, the position of the virtual material, etc.

In addition, it should be noted that a third display state of the virtual object located on the current floor is displayed on the target map, and the third display state is different from a fourth display state of the virtual object located on another floor, where the third display state and the fourth display state are respectively used for determining the floor where the virtual object is located. That is, on different floors, the display state of the virtual object is different. In some embodiments, the floors where different virtual objects are located may be distinguished through the bright region and the shaded region in the above context; for example, the current floor is the first floor, the virtual object A is on the first floor, and then the position mark corresponding to the virtual object A is highlighted; the virtual object B is on the second floor, and then the position mark corresponding to the virtual object B is shaded. In some embodiments, different colors, dotted line points, and solid line points may also be used to distinguish the floors where different virtual objects are located; for example, the current floor is the first floor, the virtual object A is on the first floor, and then the position mark corresponding to the virtual object A is represented with a black solid line point; the virtual object B is on the second floor, then the position mark corresponding to the virtual object B can be represented with a white dotted line point.

It should be further noted that, in step S406, the map corresponding to the current floor and the map corresponding to another floor are displayed in different display states, so that the game player can clearly understand the display levels of the maps of different floors according to different display states, thereby improving the game experience of the game player.

Based on the solutions defined in steps S402 to S406, it can be learned that, in the embodiments of the present disclosure, it is adopted that the maps corresponding to different floors are displayed in different display states; after obtaining the position information of the target virtual object in the game scene, the current floor where the target virtual object is located is determined according to the position information; in the graphical user interface, the first map corresponding to the current floor is displayed in the first display state, and the second map corresponding to another floor is displayed in the second display state, where the display content in the first display state is different from the display content in the second display state.

In the above process, the map corresponding to the current floor and the map corresponding to another floor are displayed in different display states, so that the game player can quickly obtain information of different floors. Moreover, since the display states of different floors are different, the game player can understand the display levels of the maps of different floors according to different display states, so that the display level of the game map is clearer and more definite, improving the game experience of the game player.

Therefore, the solution provided by the present disclosure achieves the purpose of displaying maps of different floors, thereby achieving the technical effect of improving the accuracy and clarity of the display level of the map of the floor, and further solving the technical problem that the existing game map can display information of the same floor and cannot display information of different floors.

In some embodiments, after the position information of the target virtual object in the game scene is obtained, the game terminal determines the current floor where the target virtual object is located according to the height information in the position information. Specifically, the game terminal determines the height information of the target virtual object according to the position information, then compares the height information with a preset height information to obtain a comparison result, and determines the current floor where the target virtual object is located according to the comparison result. For example, the current height of the target virtual object is h, the preset height is H, and if h>H, it is determined that the current floor where the target virtual object is located is the second floor; and if h≤H, it is determined that the current floor where the target virtual object is located is the first floor.

It should be noted that when the number of floors of the virtual building is multiple (more than 2), the game terminal may set multiple preset heights to determine the current floor where the target virtual object is located.

Figure 8:
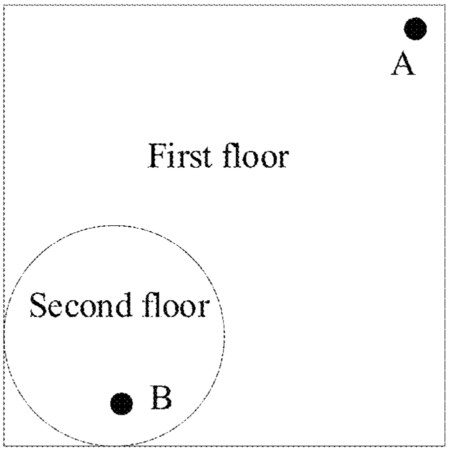
FIG. 8 is a schematic diagram of a floor according to an embodiment of the present disclosure.

In some embodiments, the game terminal may further determine the current floor where the target virtual object is located according to a manner in which the horizontal position and the height information of the target virtual object are combined. Specifically, the game terminal obtains the horizontal coordinate range corresponding to each floor, simultaneously obtains the current horizontal position of the target virtual object; if the current horizontal position is within the horizontal coordinate range of a floor, it is determined that the floor is the current floor where the target virtual object is located; if the current horizontal position is within the horizontal coordinate ranges of the plurality of floors, the current floor where the target virtual object is located is determined further according to the height information of the target virtual object and the height information corresponding to each floor. For example, in the floor schematic diagram shown in FIG. 8, the first floor and the second floor are different in shape and area, where the area of first floor is greater than the area of the second floor. If the target virtual object is located at point A, since the first floor may include the coordinate of point A, the game terminal may determine that the current floor of the target virtual object is the first floor; if the target virtual object is located at point B, since both the first floor and the second floor include the coordinate of point B, the current floor where the target virtual object is located cannot be determined according to the horizontal position of the target virtual object, and it is needed to combine the height information of the target virtual object to determine whether the current floor where the target virtual object is located is the first floor or the second floor.

Furthermore, after determining the current floor where the target virtual object is located, the game terminal may enable different mini-maps to be presented in different display states according to the current floor. For example, in FIG. 6, the target virtual object is on the first floor, and the mini-map corresponding to the first floor displays the map detail of the floor. For example, in FIG. 6, the position of the highlighted red region 60, the position of the channel 61, and the position of the door 60 in the first floor are displayed. The mini-map corresponding to the second floor may display the map overview of the second floor; for example, the contour information corresponding to the second floor region may be displayed in FIG. 6.

In some embodiments, the game terminal displays maps corresponding to different floors in a superposition display manner. Specifically, the game terminal firstly determines the floor sequence between the current floor and another floor, then performs superposition processing on the first map and the second map according to the floor sequence to obtain a target map, and displays the target map in the graphical user interface.

Specifically, the game terminal obtains the first space coordinates corresponding to the first map and the second space coordinates corresponding to the second map, and performs superposition processing on the first map and the second map in the preset direction according to the floor sequence and according to the first space coordinates and the second space coordinates to obtain a target map, that is, the space coordinates corresponding to the first map and the space coordinates corresponding to the second map are consistent in the coordinate in the vertical direction. For example, in the schematic diagram of the graphical user interface shown in FIG. 6, the map corresponding to the first floor and the map corresponding to the second floor are superimposed and displayed, and the contour of the superimposed map is a union of the map of the first floor and the map of the second floor in the vertical direction.

Furthermore, the game terminal obtains the first display state and the second display state, displays the first map in the first display state and the second map in the second display state on the target map. For example, in FIG. 7, the current floor is the second floor, and the map detail of the map of the second floor (i.e., the first map) is displayed on the target map; for example, in FIG. 7, the position of the channel 70 and the position of the table and chair 71 in the second floor are displayed; and the map overview of the map of the first floor (i.e., the second map) may be displayed; for example, the contour information corresponding to the first floor region may be displayed in FIG. 7.

In some embodiments, in the process of displaying the first map in the first display state on the graphical user interface, the game terminal obtains the position information and orientation information of the target virtual object on the current floor, and at least displays the first position mark of the target virtual object, the floor structure information of the current floor and the information of the obstacle located on the current floor on the first map according to the position information and the orientation information. For example, in the first map, the position mark of the target virtual object is represented with a fan-shaped region, the position of the fan-shaped region represents the position of the target virtual object, and the orientation of the fan-shaped region represents the movement orientation of the target virtual object. In addition, different regions are distinguished in the first map by using different color blocks; for example, the red color block represents the region where the target virtual object cannot reach; the green color code represents the region where the target virtual object can reach. Furthermore, the obstacle may also be displayed in the first map; for example, the position of the stair, the elevator, the wall, and the door can be displayed in the first map.

In some embodiments, in the process of displaying the second map in the second display state on the graphical user interface, the game terminal obtains the position information and orientation information of the target virtual object on the current floor, and displays the second position mark of the target virtual object and the contour information of the current floor on the second map according to the position information and the orientation information, where the display state of the second position mark is different from the display state of the first position mark. For example, in the second map, the position mark of another virtual object is represented with a dot, the contour of each floor may be displayed in the second map, and the detailed information of the floor is not displayed.

It should be noted that there may be multiple other floors in practical applications. For example, there are three floors in the virtual building, and in this scenario, other virtual objects located on different floors are displayed in different display states. For example, the virtual object located on the first floor is represented with a black dot, and the virtual object located on the second floor is represented with a white dot, etc. For another example, the virtual object corresponding to a teammate located on the first floor is represented with a black solid dot, and the virtual object corresponding to an enemy located on the first floor is represented with a black dotted dot; the virtual object corresponding to a teammate located on the second floor is represented with a white solid dot, and the virtual object corresponding to an enemy located on the second floor is represented with a white dotted dot.

Figure 9:
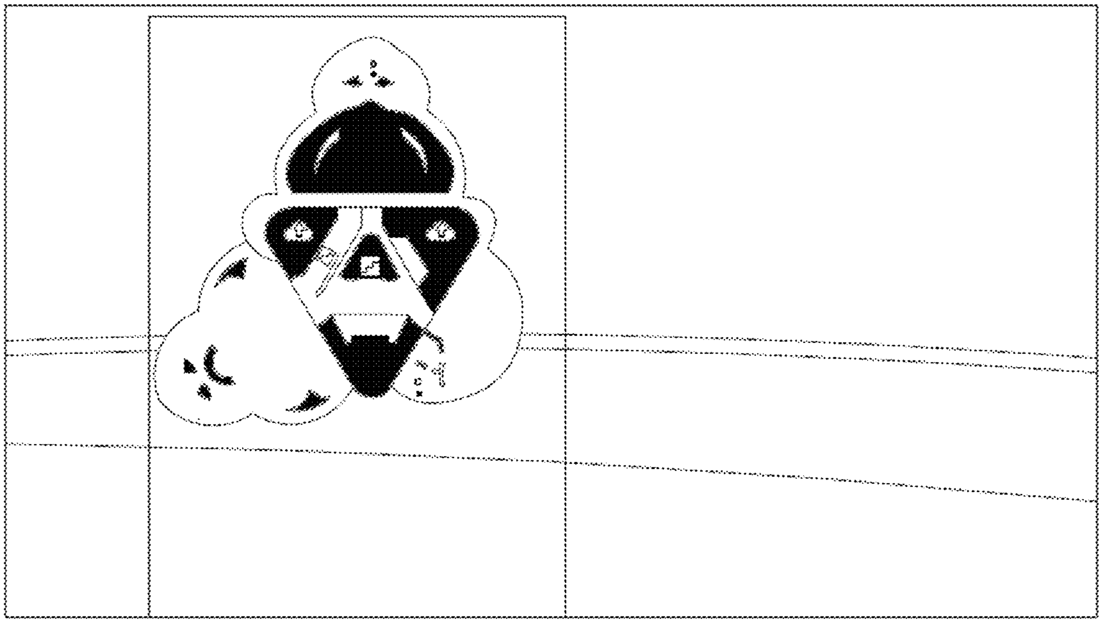
FIG. 9 is a schematic diagram of a graphical user interface according to an embodiment of the present disclosure.
Figure 10:
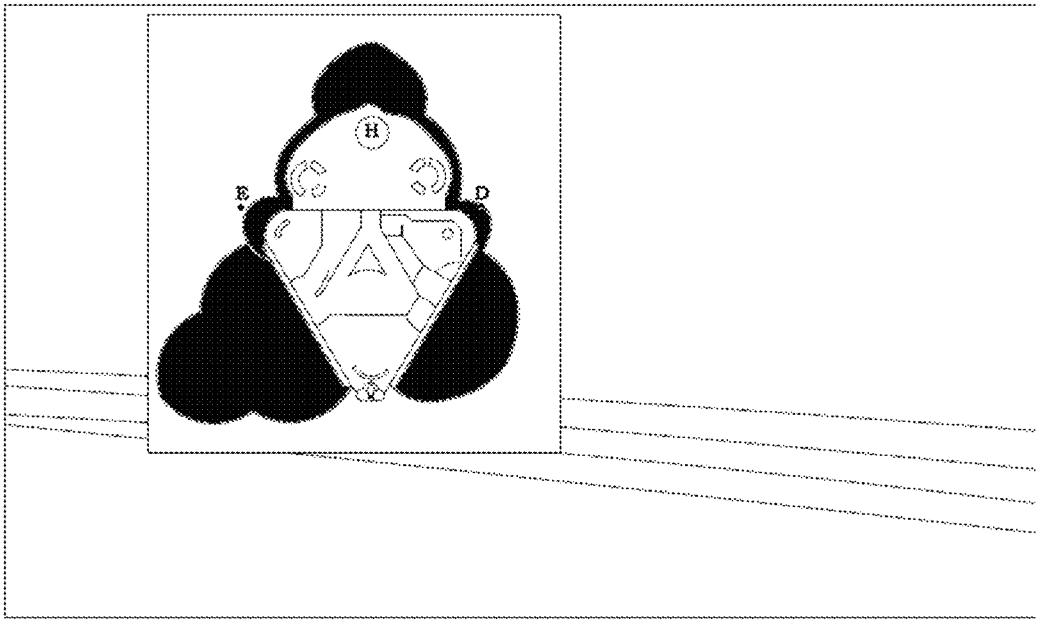
FIG. 10 is a schematic diagram of a graphical user interface according to an embodiment of the present disclosure.

In some embodiments, after displaying the target map in the graphical user interface, the game terminal displays a floor control corresponding to each floor in response to a first operation on the target map, and displays a target map corresponding to the target floor in the first display state in the graphical user interface in response to a second operation on the floor control corresponding to the target floor. For example, in the graphical user interface shown in FIG. 7, the game player performs a click operation (i.e., a first operation) on the target map, and the game terminal jumps from the graphical user interface shown in FIG. 7 to the graphical user interface shown in FIG. 9. In the graphical user interface shown in FIG. 9, the game player may switch the target map by clicking (i.e., the abovementioned second operation) the floor controls (e.g., "first floor" and "second floor" in FIG. 9); for example, in FIG. 9, the game player clicks the "first floor" control, then detailed information of a map corresponding to the first floor is displayed in the graphical user interface; In FIG. 10, the game player clicks the "second floor" control, then detailed information of the map corresponding to the second floor is displayed in the graphical user interface.

Figure 11:
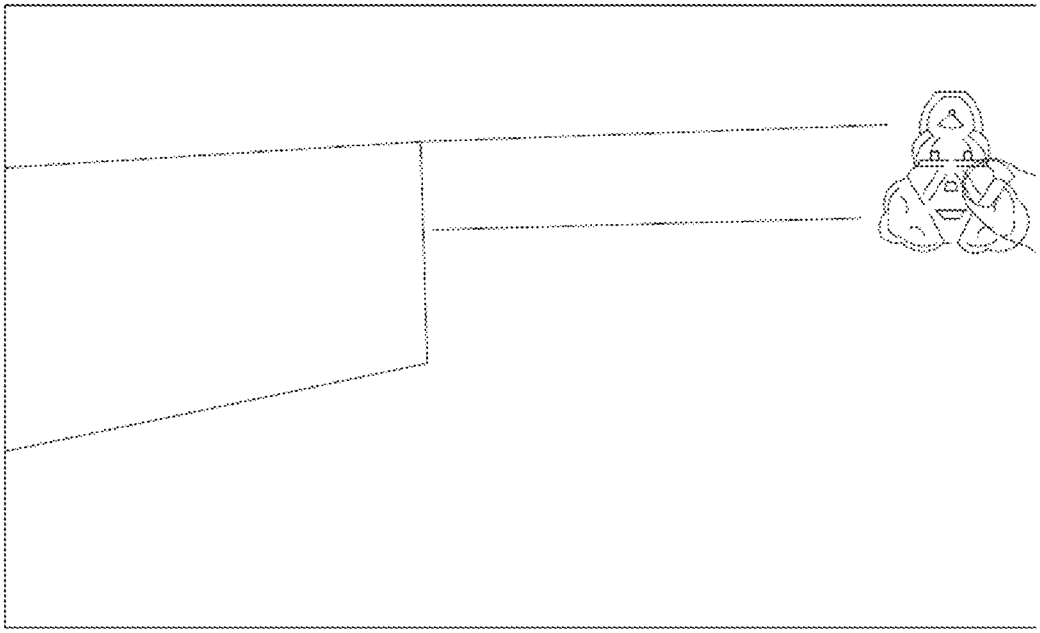
FIG. 11 is a schematic diagram of a graphical user interface according to an embodiment of the present disclosure.
Figure 12:
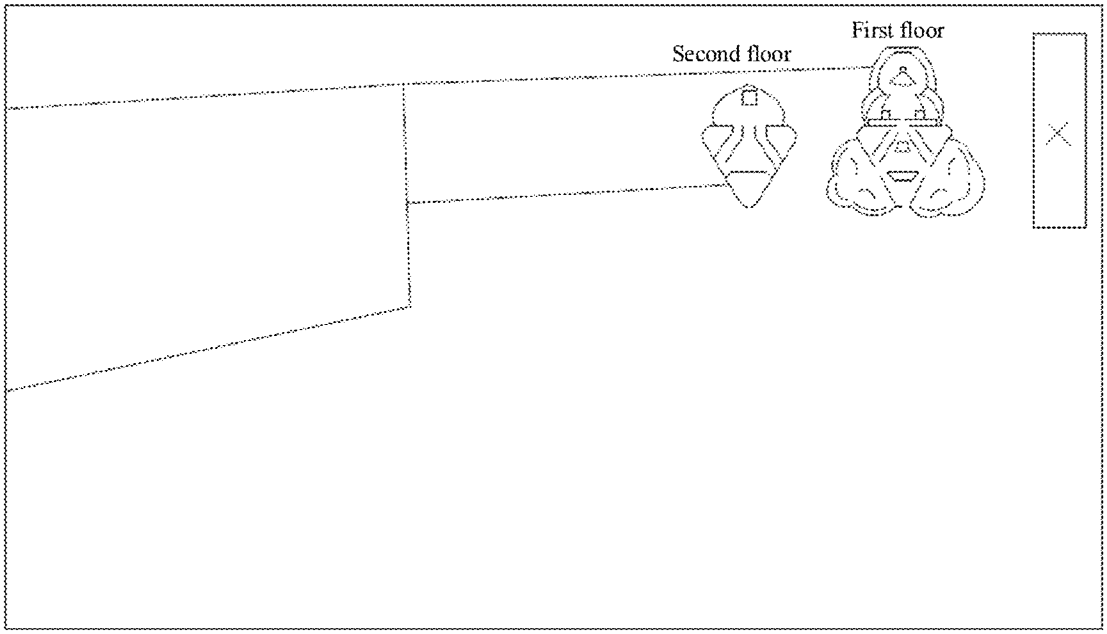
FIG. 12 is a schematic diagram of a graphical user interface according to an embodiment of the present disclosure.

In some embodiments, after the target map is displayed in the graphical user interface, the game terminal responds to a third operation on the target map, and displays the map corresponding to each floor in the first display state in the graphical user interface when the operation duration of the third operation reaches a preset duration. For example, in the graphical user interface shown in FIG. 11, after the game player presses the target map for a long time and the long-press duration (i.e. operation duration) reaches the preset duration, the game terminal jumps from the graphical user interface shown in FIG. 11 to the graphical user interface shown in FIG. 12, and displays detailed information of the map corresponding to each floor. For example, detailed information of the map of the first floor and the map of the second floor is displayed in the graphical user interface shown in FIG. 12.

Figure 13:
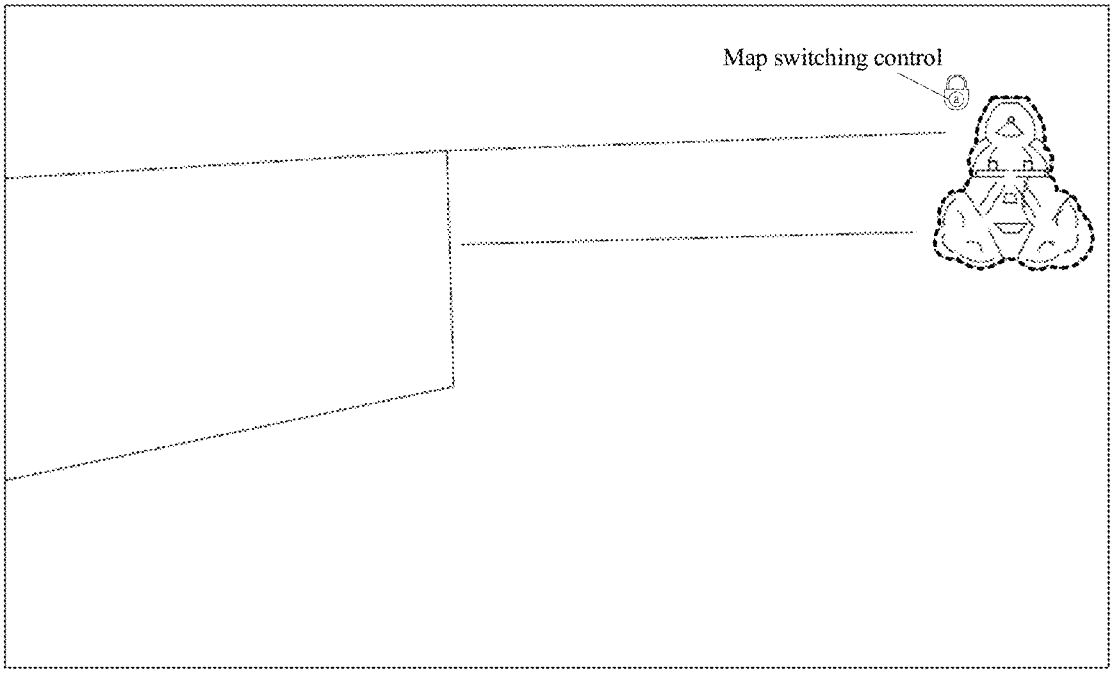
FIG. 13 is a schematic diagram of a graphical user interface according to an embodiment of the present disclosure.
Figure 14:
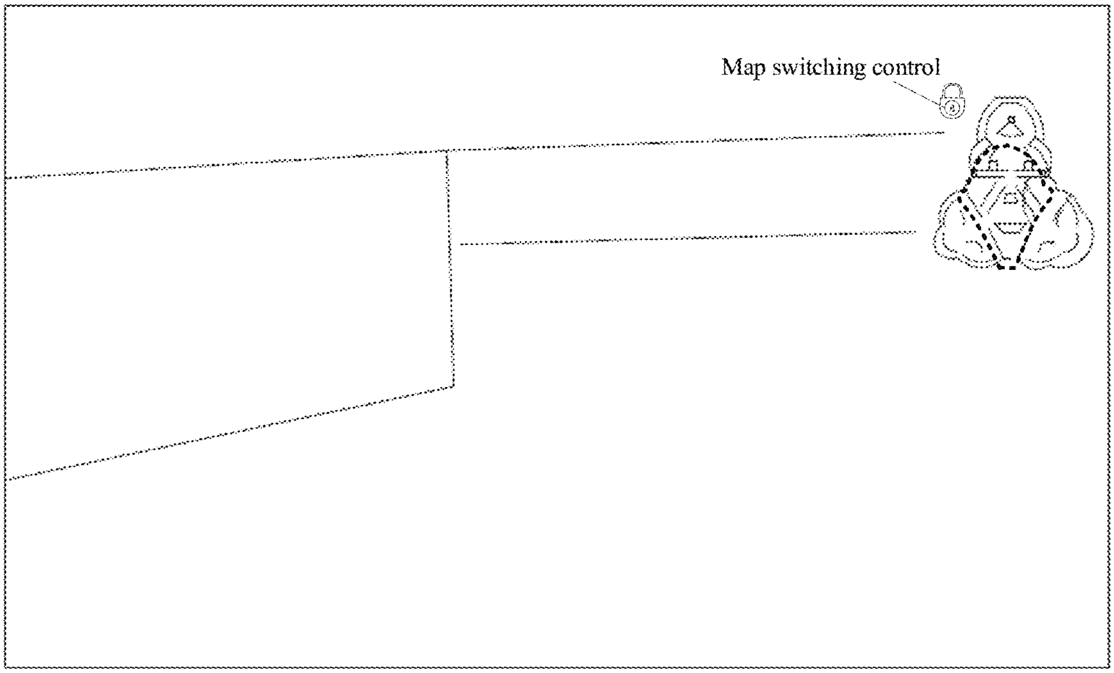
FIG. 14 is a schematic diagram of a graphical user interface according to an embodiment of the present disclosure.

There is also an embodiment, in which, after displaying the target map in the graphical user interface, the game terminal responds to the fourth operation on a map switching control in the graphical user interface, obtains the number of operations corresponding to the fourth operation, then determines the target floor to be displayed according to the number of operations, and displays the target floor on the target map in the first display state. For example, in the graphical user interface shown in FIG. 13, the upper left corner of the target map is provided with a map switching control; the game player can switch the floor map by clicking the map switching control; for example, in FIG. 13, detailed information of a map of the first floor (the dotted line region as shown in FIG. 13) is displayed, and after the game player clicks the map switching control, the game terminal jumps to the graphical user interface shown in FIG. 14, and detailed information of the map of the second floor (the dotted line region as shown in i FIG. 14) is displayed.

In the graphical user interface shown in FIG. 9, FIG. 10, FIG. 13, and FIG. 14, the game terminal displays the map of each floor on the target map according to the floor sequence. For example, in the graphical user interface shown in FIG. 14, the map of the second floor is displayed above the map of the first floor, so that the relationship between floors is clearer.

Figure 15:
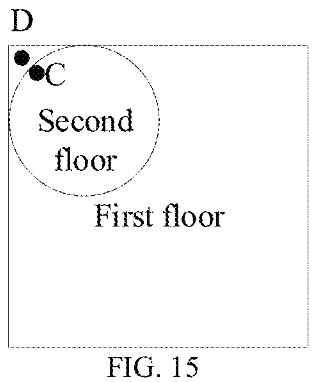
FIG. 15 is a schematic diagram of floor superposition according to an embodiment of the present disclosure.
Figure 16:
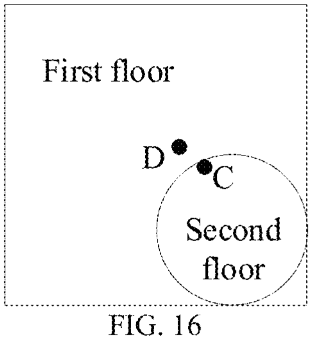
FIG. 16 is a schematic diagram of floor superposition according to an embodiment of the present disclosure.
Figure 17:
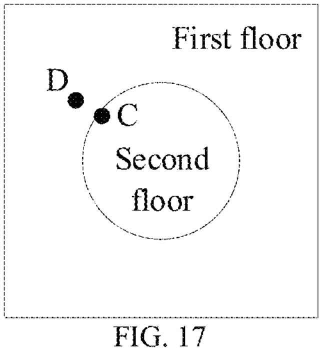
FIG. 17 is a schematic diagram of floor superposition according to an embodiment of the present disclosure.

In some embodiments, the game terminal may further determine, according to a superposition position between the first map and the second map, a position of the target virtual object moving in a vertical space from the current floor to another floor. It should be noted that the target virtual object may move from the current floor to another floor in a manner of transferring in the vertical space such as taking an elevator, climbing, jumping, etc. For example, the floor superposition schematic diagrams of FIG. 15 to FIG. 17 show three different superposition positions. In FIG. 15 to FIG. 17, the height of the current floor is greater than the height of another floor, the point C represents the position of the target virtual object on the second floor (i.e., the current floor), and the point D represents the position of the target virtual object moving from the second floor to the first floor (i.e., another floor). Due to the fact that the superposition position between the current floor and another floors is fixed, in the actual game, the game player can calculate the position of the target virtual object moving to another floor according to the first position of the target virtual object in the current floor, the speed and the acceleration information of the target virtual object, and the superposition position between the current floor and another floor; and, the position is unique. In addition, since the game terminal can obtain the position information of the target virtual object on different floors, it can be ensured that the coordinates of the target virtual object are not disordered when the floor of the target virtual object is changed.

In addition, it should be noted that in the practical application, in the schematic diagrams shown in FIG. 15 to FIG. 17, the point C and the point D may also be perpendicular in the vertical space, where the processing method is the same as the above process, and details are not described here again.

As can be seen from the above content, in the solutions provided by the present disclosure, mini-maps corresponding to multiple floors can be displayed simultaneously in the graphical user interface, so that the game player can observe from a global perspective and freely view the information points of each floor and quickly understand the distribution position of the teammate on each floor. In addition, in the solutions provided in the present disclosure, the mini-map of the non-current floor may be displayed with the outer contour, the mini-map of the current floor is display with detailed information, and the superposition relationship between the multiple floors can also be displayed, so that the floor level is clearer and more definite.

Figure 18:
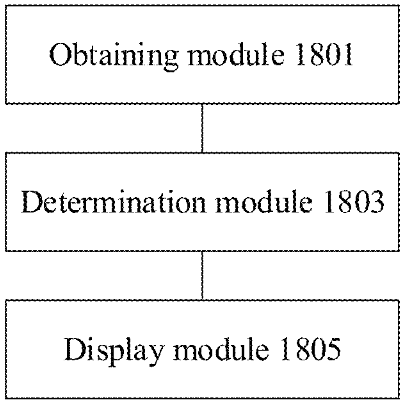
FIG. 18 is a schematic diagram of a device for displaying a multi-floor map according to an embodiment of the present disclosure.

According to an embodiment of the present disclosure, there is further provided an embodiment of a device for displaying a multi-floor map, where the device may be applied to a game terminal, and the game terminal at least includes a graphical user interface. FIG. 18 is a schematic diagram of a device for displaying a multi-floor map according to an embodiment of the present disclosure. As shown in FIG. 18, the device includes an obtaining module 1801, a determination module 1803, and a display module 1805.

Among them, the obtaining module 1801 is configured to obtain position information of a target virtual object in the game scene; the determination module 1803 is configured to determine a current floor where the target virtual object is located according to the position information; and the display module 1805 is configured to display a target map in the graphical user interface, where the target map includes a first map corresponding to that the current floor is displayed in the first display state and a second map corresponding to that another floor is displayed in the second display state, where the first display state and the second display state are respectively used for determining a display content of the target map on the graphical user interface.

It should be noted that the abovementioned obtaining module 1801, the determination module 1803, and the display module 805 correspond to steps S402 to S406 in the abovementioned embodiments, and examples and application scenarios implemented by the three modules are the same as the corresponding steps, but are not limited to the content disclosed in the abovementioned embodiments.

In some embodiments, a display content in the first display state includes a map detail of the first map and a real-time position mark of the target virtual object in the first map, a display content in the second display state includes a map overview of the second map, where the map detail of the first map and the map overview of the second map are static information, and the real-time position mark is dynamic information.

In some embodiments, the map detail of the first map at least includes a virtual environment model, and the virtual environment model at least includes a building model and a virtual object model.

In some embodiments, the display content in the first display state further includes a position mark of another virtual object located in the first map and/or a target point position mark.

In some embodiments, the display content in the second display state further includes a position mark of another virtual object located in the second map and/or a target point position mark.

In some embodiments, a third display state of the virtual object located on the current floor is displayed on the target map, and the third display state is different from a fourth display state of a virtual object located on another floor, where the third display state and the fourth display state are respectively used for determining a floor where the virtual object is located.

In some embodiments, the determination module includes: a first determination module, a comparison module, and a second determination module. Among them, the first determination module is configured to determine height information of the target virtual object according to the position information; the comparison module is configured to obtain a comparison result by comparing the height information with preset height information; and the second determination module is configured to determine the current floor where the target virtual object is located according to the comparison result.

In some embodiments, the display module includes a third determination module, a first superposition module, and a first display module. The third determination module is configured to determine a floor sequence between the current floor and another floor; the first superposition module is configured to obtain the target map by performing superposition processing on the first map and the second map according to the floor sequence; and the first display module is configured to display the target map in the graphical user interface.

In some embodiments, the first superposition module includes a first obtaining module and a second superposition module. The first obtaining module is configured to obtain first space coordinates corresponding to the first map and second space coordinates corresponding to the second map; and the second superposition module is configured to obtain the target map by performing superposition processing on the first map and the second map in a preset direction according to the floor sequence and according to the first space coordinates and the second space coordinates.

In some embodiments, the display module includes a second obtaining module and a second display module. The second obtaining module is configured to obtain the first display state and the second display state; and the second display module is configured to display, on the target map, the first map in the first display state and the second map in the second display state.

In some embodiments, the second display module includes a third obtaining module and a third display module. The third obtaining module is configured to obtain position information and orientation information of the target virtual object on the current floor; and the third display module is configured to display at least a first position mark of the target virtual object, floor structure information of the current floor and information of an obstacle located on the current floor on the first map according to the position information and the orientation information.

In some embodiments, the second display module includes a fourth obtaining module and a fourth display module. The fourth obtaining module is configured to obtain position information and orientation information of the target virtual object on the current floor; and the fourth display module is configured to display a second position mark of the target virtual object and contour information of the current floor on the second map according to the position information and the orientation information, where a display state of the second position mark is different from a display state of the first position mark.

In some embodiments, the device for displaying a multi-floor map further includes a first response module and a second response module. The first response module is configured to display a floor control corresponding to each floor in response to a first operation on the target map after displaying the target map in the graphical user interface; and the second response module is configured to display a target map corresponding to the target floor in the first display state in the graphical user interface in response to a second operation on a floor control corresponding to the target floor.

In some embodiments, the device for displaying a multi-floor map further includes a third response module and a fifth display module. The third response module is configured to, after displaying the target map in the graphical user interface, respond to a third operation on the target map; and the fifth display module is configured to display a map corresponding to each floor in the first display state in the graphical user interface when an operation duration of the third operation reaches a preset duration.

In some embodiments, the device for displaying a multi-floor map further includes a fourth response module, a fourth determination module, and a sixth display module. Among them, the fourth response module is configured to, after displaying the target map in the graphical user interface, obtain an operation number corresponding to the fourth operation in response to a fourth operation on a map switching control in the graphical user interface; the fourth determination module is configured to determine a target floor to be displayed according to the operation number; and the sixth display module is configured to display the target floor in the first display state on the target map.

In some embodiments, the device for displaying a multi-floor map further includes a fifth determination module, configured to determine a position of the target virtual object moving in the vertical space from the current floor to another floor according to a superposition position between the first map and the second map.

According to another aspect of the embodiments of the present disclosure, there is further provided a non-volatile storage medium. A computer program is stored in the non-volatile storage medium, and the computer program is configured to execute the method for displaying the multi-floor map when running.

Specifically, the computer program may be configured to execute the following method steps when running: obtaining position information of a target virtual object in the game scene; determining a current floor where the target virtual object is located according to the position information; and displaying a target map in the graphical user interface, where the target map includes a first map corresponding to that the current floor is displayed in a first display state and a second map corresponding to that another floor is displayed in a second display state, where the first display state and the second display state are respectively used for determining a display content of the target map on the graphical user interface.

In some embodiments, a display content in the first display state includes a map detail of the first map and a real-time position mark of the target virtual object in the first map, a display content in the second display state includes a map overview of the second map, where the map detail of the first map and the map overview of the second map are static information, and the real-time position mark is dynamic information.

In some embodiments, the map detail of the first map at least includes a virtual environment model, and the virtual environment model at least includes a building model and a virtual object model.

In some embodiments, the display content in the first display state further includes a position mark of another virtual object located in the first map and/or a target point position mark.

In some embodiments, the display content in the second display state further includes a position mark of another virtual object located in the second map and/or a target point position mark.

In some embodiments, a third display state of the virtual object located on the current floor is displayed on the target map, and the third display state is different from a fourth display state of a virtual object located on another floor, where the third display state and the fourth display state are respectively used for determining a floor where the virtual object is located.

In some embodiments, the computer program may further be configured to execute the following method steps when running: determining height information of the target virtual object according to the position information; obtaining a comparison result by comparing the height information with preset height information; and determining the current floor where the target virtual object is located according to the comparison result.

In some embodiments, the computer program may further be configured to execute the following method steps when running: determining a floor sequence between the current floor and another floor; obtaining the target map by performing superposition processing on the first map and the second map according to the floor sequence; and displaying the target map in the graphical user interface.

In some embodiments, the computer program may further be configured to execute the following method steps when running: obtaining first space coordinates corresponding to the first map and second space coordinates corresponding to the second map; and obtaining the target map by performing superposition processing on the first map and the second map in a preset direction according to the floor sequence and according to the first space coordinates and the second space coordinates.

In some embodiments, the computer program may further be configured to execute the following method steps when running: obtaining the first display state and the second display state; and displaying, on the target map, the first map in the first display state and the second map in the second display state.

In some embodiments, the computer program may further be configured to execute the following method steps when running: obtaining position information and orientation information of the target virtual object on the current floor; and displaying at least a first position mark of the target virtual object, floor structure information of the current floor and information of an obstacle located on the current floor on the first map according to the position information and the orientation information.

In some embodiments, the computer program may further be configured to execute the following method steps when running: obtaining position information and orientation information of the target virtual object on the current floor; and displaying a second position mark of the target virtual object and contour information of the current floor on the second map according to the position information and the orientation information, where a display state of the second position mark is different from a display state of the first position mark.

In some embodiments, the computer program may further be configured to execute the following method steps: after displaying the target map in the graphical user interface, displaying a floor control corresponding to each floor in response to a first operation on the target map; and displaying a target map corresponding to the target floor in the first display state in the graphical user interface in response to a second operation on a floor control corresponding to the target floor.

In some embodiments, the computer program may further be configured to execute the following method steps: after displaying the target map in the graphical user interface, responding to a third operation on the target map; and displaying a map corresponding to each floor in the first display state in the graphical user interface when an operation duration of the third operation reaches a preset duration.

In some embodiments, the computer program may further be configured to execute the following method steps: after displaying the target map in the graphical user interface, obtaining, in response to a fourth operation on a map switching control in the graphical user interface, an operation number corresponding to the fourth operation; determining a target floor to be displayed according to the operation number; and displaying the target floor in the first display state on the target map.

In some embodiments, the computer program may further be configured to execute the following method steps when running: determining a position of the target virtual object moving in a vertical space from the current floor to another floor according to a superposition position between the first map and the second map.

According to another aspect of the embodiments of the present disclosure, there is further provided a processor, and the processor is configured to run a program, where the program is configured to execute the method for displaying a multi-floor map when running.

Specifically, the program may be configured to execute the following method steps when running: obtaining position information of a target virtual object in the game scene; determining a current floor where the target virtual object is located according to the position information; and displaying a target map in the graphical user interface, where the target map includes a first map corresponding to that the current floor is displayed in a first display state and a second map corresponding to that another floor is displayed in a second display state, where the first display state and the second display state are respectively used for determining a display content of the target map on the graphical user interface.

In some embodiments, a display content in the first display state includes a map detail of the first map and a real-time position mark of the target virtual object in the first map, a display content in the second display state includes a map overview of the second map, where the map detail of the first map and the map overview of the second map are static information, and the real-time position mark is dynamic information.

In some embodiments, the map detail of the first map at least includes a virtual environment model, and the virtual environment model at least includes a building model and a virtual object model.

In some embodiments, the display content in the first display state further includes a position mark of another virtual object located in the first map and/or a target point position mark.

In some embodiments, the display content in the second display state further includes a position mark of another virtual object located in the second map and/or a target point position mark.

In some embodiments, a third display state of the virtual object located on the current floor is displayed on the target map, and the third display state is different from a fourth display state of a virtual object located on another floor, where the third display state and the fourth display state are respectively used for determining a floor where the virtual object is located.

In some embodiments, the program may further be configured to execute the following method steps when running: determining height information of the target virtual object according to the position information; obtaining a comparison result by comparing the height information with preset height information; and determining the current floor where the target virtual object is located according to the comparison result.

In some embodiments, the program may further be configured to execute the following method steps when running: determining a floor sequence between the current floor and another floor; obtaining the target map by performing superposition processing on the first map and the second map according to the floor sequence; and displaying the target map in the graphical user interface.

In some embodiments, the program may further be configured to execute the following method steps when running: obtaining first space coordinates corresponding to the first map and second space coordinates corresponding to the second map; and obtaining the target map by performing superposition processing on the first map and the second map in a preset direction according to the floor sequence and according to the first space coordinates and the second space coordinates.

In some embodiments, the program may further be configured to execute the following method steps when running: obtaining the first display state and the second display state; and displaying, on the target map, the first map in the first display state and the second map in the second display state.

In some embodiments, the program may further be configured to execute the following method steps when running: obtaining position information and orientation information of the target virtual object on the current floor; and displaying at least a first position mark of the target virtual object, floor structure information of the current floor and information of an obstacle located on the current floor on the first map according to the position information and the orientation information.

In some embodiments, the program may further be configured to execute the following method steps when running: obtaining position information and orientation information of the target virtual object on the current floor; and displaying a second position mark of the target virtual object and contour information of the current floor on the second map according to the position information and the orientation information, where a display state of the second position mark is different from a display state of the first position mark.

In some embodiments, the program may further be configured to execute the following method steps: after displaying the target map in the graphical user interface, displaying a floor control corresponding to each floor in response to a first operation on the target map; and displaying a target map corresponding to the target floor in the first display state in the graphical user interface in response to a second operation on a floor control corresponding to the target floor.

In some embodiments, the program may further be configured to execute the following method steps: after displaying the target map in the graphical user interface, responding to a third operation on the target map; and displaying a map corresponding to each floor in the first display state in the graphical user interface when an operation duration of the third operation reaches a preset duration.

In some embodiments, the program may further be configured to execute the following method steps: after displaying the target map in the graphical user interface, obtaining, in response to a fourth operation on a map switching control in the graphical user interface, an operation number corresponding to the fourth operation; determining a target floor to be displayed according to the operation number; and displaying the target floor in the first display state on the target map.

In some embodiments, the program may further be configured to execute the following method steps when running: determining a position of the target virtual object moving in a vertical space from the current floor to another floor according to a superposition position between the first map and the second map.

The sequence numbers of the embodiments of the present disclosure are merely for description, and do not represent the advantages and disadvantages of the embodiments.

In the above embodiments of the present disclosure, the description of each embodiment has its own emphasis, and the part of the embodiments that are not described in detail in some embodiments may refer to the related description of other embodiments.

In the several embodiments provided in the present disclosure, it should be understood that the disclosed technical content may be implemented in other manners. Among them, the device embodiments described above are merely illustrative, for example, the division of the units may be a logical function division, and there may be other division manners in the actual implementation; for example, a plurality of units or components may be combined or may be integrated into another system, or some features may be ignored or not performed. For another point, the mutual coupling or direct coupling or communication connection shown or discussed may be an indirect coupling or communication connection through some interfaces, units, or modules, and may be in an electrical or other form.

The units described as separate components may or may not be physically separate, and components displayed as units may or may not be physical units, that is, may be located in one place, or may be distributed on multiple units. Some or all of the units may be selected according to actual needs to achieve the objectives of the solutions of the embodiments.

In addition, various functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such understanding, the technical solution of the present disclosure in essence, or the part that contributes to the related art, or all or part of the technical solution may be embodied in the form of a software product. The computer software product is stored in a storage medium, and includes several instructions for enabling a computer device (which may be a personal computer, a server, or a network device, etc.) to perform all or part of the steps of the method according to various embodiments of the present disclosure. The foregoing storage medium includes various media that can store program codes, such as a USB flash disk, a read-only memory (ROM), a random access memory (RAM), a mobile hard disk, a magnetic disk, or an optical disc.

The foregoing is preferred embodiments of the present disclosure, and it should be noted that, for those of ordinary skill in the art, several improvements and modifications may be made without departing from the principles of the present disclosure, and these improvements and modifications should also be regarded as within the protection scope of the present disclosure.

What is claimed is:

1. A method for displaying a multi-floor map, comprising:

obtaining, by a game terminal, position information of a target virtual object in a game scene, the game terminal at least comprising a graphical user interface;

determining a current floor where the target virtual object is located according to the position information; and displaying a target map in the graphical user interface, wherein the target map comprises a first map corresponding to the current floor displayed in a first display state and a second map corresponding to another floor displayed in a second display state, wherein the first display state and the second display state are respectively used for determining a display content of the target map on the graphical user interface.

2. The method according to claim 1, wherein a display content in the first display state comprises a map detail of the first map and a real-time position mark of the target virtual object in the first map, a display content in the second display state comprises a map overview of the second map, wherein the map detail of the first map and the map overview of the second map are static information, and the real-time position mark is dynamic information.

3. The method according to claim 2, wherein the map detail of the first map at least comprises a virtual environment model, and the virtual environment model at least comprises a building model and a virtual object model.

4. The method according to claim 2, wherein the display content in the first display state further comprises a position mark of another virtual object located in the first map and/or a target point position mark.

5. The method according to claim 2, wherein the display content in the second display state further comprises a position mark of another virtual object located in the second map and/or a target point position mark.

6. The method according to claim 4, wherein a third display state of a virtual object located on the current floor is displayed on the target map, and the third display state is different from a fourth display state of the virtual object located on the another floor, wherein the third display state and the fourth display state are respectively used for determining a floor where the virtual object is located.

7. The method according to claim 1, wherein determining the current floor where the target virtual object is located according to the position information comprises:

determining height information of the target virtual object according to the position information;

obtaining a comparison result by comparing the height information with preset height information; and determining the current floor where the target virtual object is located according to the comparison result.

8. The method according to claim 1, wherein displaying the target map in the graphical user interface comprises:

determining a floor sequence between the current floor and the another floor;

obtaining the target map by performing superposition processing on the first map and the second map according to the floor sequence; and displaying the target map in the graphical user interface.

9. The method according to claim 8, wherein obtaining the target map by performing superposition processing on the first map and the second map according to the floor sequence, comprises:

obtaining first space coordinates corresponding to the first map and second space coordinates corresponding to the second map; and obtaining the target map by performing superposition processing on the first map and the second map in a preset direction according to the floor sequence and according to the first space coordinates and the second space coordinates.

10. The method according to claim 8, wherein displaying the target map in the graphical user interface comprises:

obtaining the first display state and the second display state; and displaying, on the target map, the first map in the first display state and the second map in the second display state.

11. The method according to claim 10, wherein displaying the first map in the first display state and the second map in the second display state comprises:

obtaining position information and orientation information of the target virtual object on the current floor; and displaying at least a first position mark of the target virtual object, floor structure information of the current floor and information of an obstacle located on the current floor on the first map according to the position information and the orientation information.

12. The method according to claim 11, wherein displaying the first map in the first display state and the second map in the second display state further comprises:

displaying a second position mark of the target virtual object and contour information of the current floor on the second map according to the position information and the orientation information, wherein a display state of the second position mark is different from a display state of the first position mark.

13. The method according to claim 8, the method further comprises:

displaying, in response to a first operation on the target map, a floor control corresponding to each floor; and displaying, in response to a second operation on a floor control corresponding to the target floor, a target map corresponding to the target floor in the first display state in the graphical user interface.

14. The method according to claim 8, the method further comprises:

responding to a third operation on the target map; and displaying, in response to determining that an operation duration of the third operation reaches a preset duration, a map corresponding to each floor in the first display state in the graphical user interface.

15. The method according to claim 8, the method further comprises:

obtaining, in response to a fourth operation on a map switching control in the graphical user interface, an operation number corresponding to the fourth operation;

determining a target floor to be displayed according to the operation number; and displaying the target floor in the first display state on the target map.

16. The method according to claim 8, wherein the method further comprises:

determining, according to a superposition position between the first map and the second map, a position of the target virtual object moving in a vertical space from the current floor to the another floor.

17. The method according to claim 5, wherein a third display state of a virtual object located on the current floor is displayed on the target map, and the third display state is different from a fourth display state of the virtual object located on the another floor, wherein the third display state and the fourth display state are respectively used for determining a floor where the virtual object is located.

18. The method according to claim 1, wherein a bright region and a shaded region in the graphical user interface are used for distinguishing at least one of:

the first map and the second map;

a display content of the first map corresponding to the current floor and a display content of the second map corresponding to the another floor; or a region where the target virtual object is located and another region.

19. A non-volatile storage medium, wherein a computer program is stored in the non-volatile storage medium, wherein the computer program is configured to execute a method for displaying a multi-floor map when running, wherein the method comprises:

obtaining, position information of a target virtual object in a game scene;

determining a current floor where the target virtual object is located according to the position information; and displaying a target map in a graphical user interface, wherein the target map comprises a first map corresponding to the current floor displayed in a first display state and a second map corresponding to another floor displayed in a second display state, wherein the first display state and the second display state are respectively used for determining a display content of the target map on the graphical user interface.

20. A processor, wherein the processor is configured to run a program, wherein the program is configured to execute a method for displaying a multi-floor map when running, wherein the method comprises:

obtaining, position information of a target virtual object in a game scene;

determining a current floor where the target virtual object is located according to the position information; and displaying a target map in a graphical user interface, wherein the target map comprises a first map corresponding to the current floor displayed in a first display state and a second map corresponding to another floor displayed in a second display state, wherein the first display state and the second display state are respectively used for determining a display content of the target map on the graphical user interface.

* * * * *